J. C. BETHEA.
Side-Hill Plow.
No. 61,796.
Patented Feb. 5, 1867.
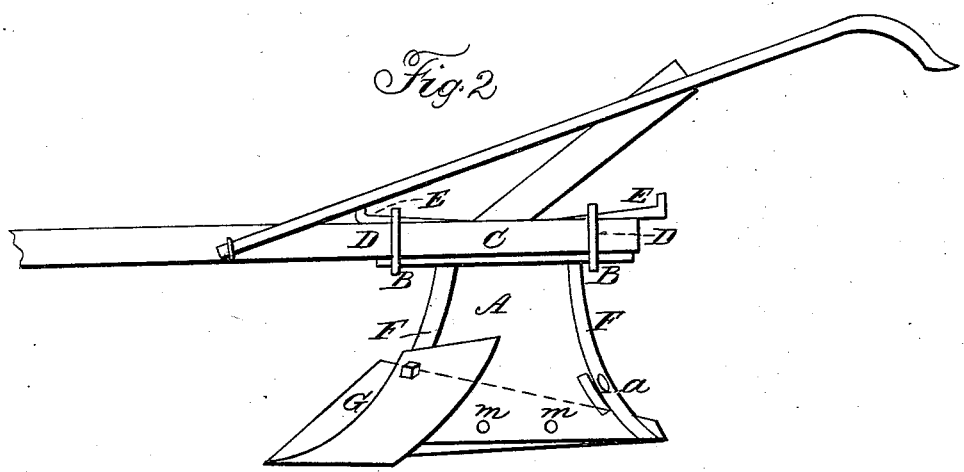
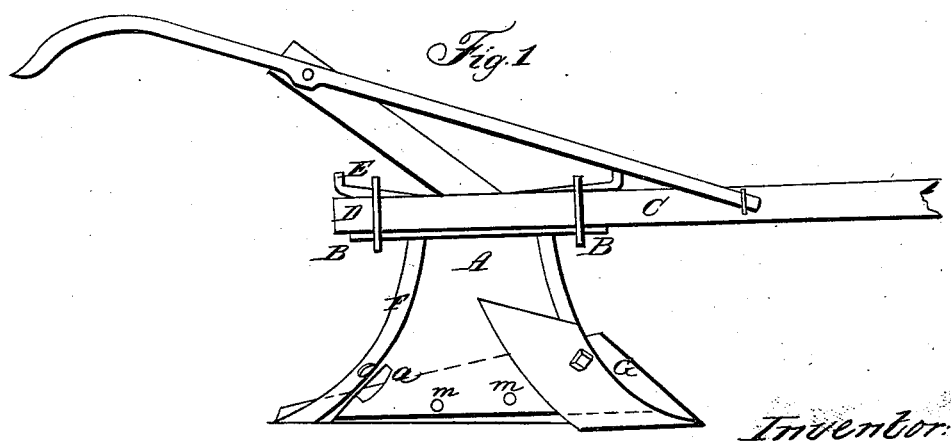

United States Patent Office.

JAMES C. BETHEA, OF BLAKELY, GEORGIA.

Letters Patent No. 61,796, dated February 5, 1867.

IMPROVEMENT IN GANG-PLOUGHS.

*The Schedule referred to in these Letters Patent and making part of the same.*

TO ALL WHOM IT MAY CONCERN:

Be it known that I, JAMES C. BETHEA, of Blakely, in the county of Early, and State of Georgia, have invented a new and improved Cotton Cultivator; and I do hereby declare the following to be a full, clear, and exact description of the same, sufficient to enable one skilled in the art to which the invention appertains to make use of it, reference being had to the accompanying drawings, which form a part of this specification, and in which—

Figures 1 and 2 are elevations, showing the plough arranged for right and left hands respectively.

The sheth or standard is made of the same shape towards the front and to the rear, to either of which the share may be attached so as to adapt it to throw the furrow to the right or to the left, the beam itself being shifted end for end to adapt it to the change.

In the drawings, A is a wide plate, forming the sheth or standard, having a plate, B, at its upper edge, whereby it is bolted or otherwise attached to the beam C. In the drawings it is shown attached by links or shackles D, and keys E, which is perhaps as ready a mode of attaching as can readily be found. At the front and rear edge respectively of the standard A is an angular flange, F, to which the mould-board or share is or may be bolted. In fig. 1, one of the flanges is so utilized, and in fig. 2, the other has a share attached, the holes $a$ through the plate admitting of the manipulation of the nut, the bolt passing through a hole in the flange. The land-side G, when one is used, is always attached to the same side of the standard, but its high, inclined, sharp edge is presented in the direction the plough is travelling. The bolts $m$ $m$ are the means of attaching, the holes in the land-side and standard corresponding whichever way the point is presented. By these means a plough may be readily adapted for either right or left-hand ploughing without any extra piece, but merely the transposition of parts. The ploughs or shares attached to the beam may be of such shape or character as may be desired.

Having described my invention, what I claim therein as new, and desire to secure by Letters Patent, is—

1. The standard A, with flanges at the front and rear edges adapted for the attachment of a right or left share, substantially as described.

2. In combination with the standard A, I claim the reversible land-side, constructed and applied substantially as described and represented.

To the above specification of my improved cotton cultivator I have signed my hand this 22d of December, 1866.

J. C. BETHEA.

Witnesses:
SOLON C. KEMON,
A. M. TANNER.